United States Patent Office 3,574,222
Patented Apr. 6, 1971

3,574,222
PREPARATION OF 5-AMINO-1,2,4-OXADIAZOLES
Fernand G. F. Eloy, Rhode St. Genese, and René A. V. Lenaers, Brussels, Belgium, assignors to Mallinckrodt Chemical Works, St. Louis, Mo.
No Drawing. Filed Dec. 29, 1965, Ser. No. 517,433
Int. Cl. C07d 85/52
U.S. Cl. 260—296                                          1 Claim

ABSTRACT OF THE DISCLOSURE

The preparation of 5-amino-1,2,4-oxadiazoles by reacting the corresponding 5-trihalomethyl-1,2,4-oxadiazole with the corresponding amine. The compounds may be used as curing agents or hardeners for epoxy resin systems and as nematocides.

---

This invention relates to the preparation of heterocyclic organic compounds. In one aspect, this invention relates to a novel process for the preparation of 5-amino-1,2,4-oxadiazoles. In a further aspect, this invention is directed to novel compositions obtained by the aforementioned process.

Heretofore, the 5-amino-1,2,4-oxadiazoles were prepared by a variety of methods known in the literature. For example, 3-phenyl-5-amino-1,2,4-oxadiazole was first synthesized by G. Ponzio via a Beekmann rearrangement from phenylamino-glyoxime as reported in Gazz. Chem. Ital. 62, 854 (1932). Its preparation by hydrolysis of 3-phenyl-5-ureido-1,2,4-oxadiazole has also been the subject of U.S. Pats. 2,399,599 and 2,403,723 granted to D. W. Kaiser on Apr. 30, 1946 and July 9, 1946 respectively. There is also described in La Chimica e l'Industria, page 807, 1961, the synthesis of 3-phenyl-5-amino-1,2,4-oxadiazole by the reaction of cyanamid on benzhydroxamyl chloride and benzonitrile-oxide respectively or via a six-step process from benzamidoxime. More recently, various amino-1,2,4-oxadiazoles were prepared by condensing a halogenated aromatic-containing amidoxime derivative with an amine as disclosed by Palozzo and Silvestrini in U.S. Pat. 3,141,019. However, in each instance, the amine group is attached to the ring carbon atom through a carbon to carbon bond.

None of the methods previously described in the literature is very attractive either due to the fact that the yield is rather low or the starting materials are not readily available or both. For example, Palozzo et al. have reported in the Journal of Medicinal and Pharmaceutical Chemistry, vol. 4, No. 2 (1961) that very low yields are obtained, when attempts were made to prepare 3-aryl-5-β-chloroethyloxadiazoles by ring closure of β-chloropropionylamidoximes followed by amination. In contrast, this invention provides a novel route to 5-amino-1,2,4-oxadiazoles from starting materials which themselves can be prepared in relatively high yields.

It is therefore an object of this invention to provide a novel process for the preparation of 5-amino-1,2,4-oxadiazoles. Another object of this invention is to provide a novel process for the preparation of 5-amino-1,2,4-oxadiazoles from readily available starting materials. A further object is to provide a novel process for the preparation of 5-amino-1,2,4-oxadiazoles from 3-trihalomethyl-1,2,4-oxadiazoles. Another object is to provide certain novel amino-1,2,4-oxadiazoles. These and other objects will readily become apparent to those skilled in the art in the light of the teachings herein set forth.

In its broad aspect the present invention relates to a novel process for the preparation of 5-amino-1,2,4-oxadiazoles and also to certain novel compositions. The process of the invention comprises contacting a 5-trihalomethyl-1,2,4-oxadiazole with ammonia or an amine and thereafter recovering the 5-amino-1,2,4-oxadiazole. The reaction can be illustrated by the following reaction:

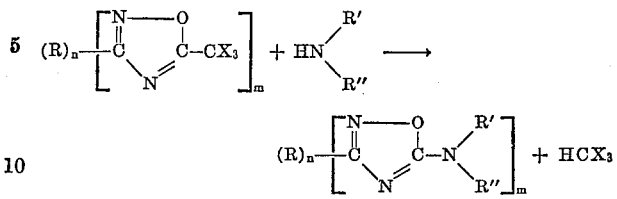

where X represents halogen; R represents an aliphatic, cyclo-aliphatic, aromatic, or heterocyclic groups; R' and R" represent hydrogen, aliphatic, cycloaliphatic, heterocyclic or aromatic groups, or both R' and R" when taken together can form a 5 or 6 membered cyclic group with the nitrogen atom to which they are attached; m has a value of 1 or 2, and n has a value of 1 when m is 1, and a value of zero or 1 when m is 2. The R, R' and R" groups preferably each contain up to 18 carbon atoms.

Preferred compositions which can be prepared by the process of this invention are those wherein X represents a chloro group; R represents alkyl, alkenyl, hydroxyalkyl, cycloalkyl, cycloalkenyl, cycloalkylalkyl, cycloalkenylalkyl, aryl, aralkyl, alkaryl, haloaryl, haloarylalkyl, pyridyl, nitrofuryl, and the like; and R' and R" represent hydrogen, alkyl, alkenyl, cycloalkyl, cycloalkenyl, aryl, aralkyl, alkaryl, amino, aminoalkyl, alkylaminoalkyl, dialkylaminoalkyl, or both R' and R" when taken with the nitrogen atom to which they are attached can represent pyridyl, piperidyl, pyrrolidyl, and the like.

Illustrative 5-amino-1,2,4-oxadiazoles which can be prepared by the process of this invention include, among others, the 3-alkyl-5-amino-1,2,4-oxadiazoles, e.g., 3-methyl-5-amino-1,2,4-oxadiazole; the 3-aryl-5-amino1,2,4-oxadiazoles, e.g., 3-phenyl-5-amino-1,2,4-oxadiazole; the 3 - aryl - 5 - (N,N-dialkylaminoalkylamino)-1,2,4-oxadiazoles, e.g., 3-phenyl-5-(N,N-dimethylaminoethylamino)-1,2,4 - oxadiazole, 3-phenyl-5-(N,N-diisobutylaminoethylamino)-1,2,4-oxadiazole, and the like, 5,5'-diamino-bi-(1,2,4 - oxadiazolyl); 1,4-di(5-amino-1,2,4-oxadiazole)-n-butane; 3-β-hydroxyethyl-5-amino 1,2,4-oxadiazole, and the like.

As previously indicated, the process of this invention is effected by contacting the 5-trihaloalkyl-1,2,4-oxadiazole with ammonia or an amine and thereafter recovering the 5-amino-1,2,4-oxadiazole. The temperature at which the reaction is conducted is not necessarily critical and it can be effected at temperatures within the range of from about 0° to about 150° C., and more preferably from about 20° C. to about 80° C.

If desired, the reaction between the amine and the oxadiazole can be conducted in the presence of a solvent which is inert to the reactants and which is easily separated from the product. However, the use of a solvent is not always required since the amine, if employed in a large excess, can serve as the medium in which the reaction is effected. Illustrative solvents include water, mixtures of water and alcohol, or an organic solvent such as methanol, ethanol, benzene, and the like.

Although the ratio of oxadiazole to amine is not critical, it has been found that optimum results can be obtained when an excess of amine is utilized.

Recovery of the final product is easily accomplished by distillation or recrystallization.

The starting materials which are employed in the preparation of the 5-amino-1,2,4-oxadiazoles of this invention are the 3,5-disubstituted 1,2-4-oxadiazoles wherein the substituents in the 5-positions is a trihaloalkyl group. The 1,2,4-oxadiazoles having the halogenated group in the 3-position are not useful due to low reactivity.

In addition to ammonia, illustrative amines which can be employed are the primary and secondary saturated and unsaturated amines, primary and secondary arylaliphatic amines, primary and secondary alicyclic amines, hydrazine and substituted hydrazines, guanidine, non-aromatic cyclic amines, heterocyclic amines.

Typical amines which are suitable for use include, methylamine, ethylamine, dimethylamine, methyl-ethylamine, allylamine, N-methyl-allylamine, diallylamine, phenyl-isopropylamine, N-methyl-phenyl-isopropylamine, benzylamine, N-phenyl-benzylamine, N-phenyl-benzylamine, cyclohexylamine, dicyclohexylamine, cyclopentylamine, N-ethyl and N-butyl-cyclohexylamine, hydrazine, phenylhydrazine, guanidine, pyrrolidine, piperidine, piperazine, morpholine, ethyleneimine, pyrroline, aminopyridine, aminotriazol, thiophenine, furfurylamine, and the like. Illustrative of the 1,2,4-oxadiazoles which can be employed as starting materials include 3-(isopropyl)-5-trichloromethyl-1,2,4-oxadiazole,
3-methyl-5-trichloromethyl-1,2,4-oxadiazole,
3-ethyl-5-trichloromethyl-1,2,4-oxadiazole,
3-gamma-trichloropropyl-5-trichloromethyl-1,2,4-oxadiazole,
3-(t-butyl)-5-trichloromethyl-1,2,4-oxadiazole,
3-(n-nonyl)-5-trichloromethyl-1,2,4-oxadiazole,
3-methyl-5-tribromomethyl-1,2,4-oxadiazole,
3-allyl-5-trichloromethyl-1,2,4-oxadiazole,
3-(cyclohexen-3-yl)-5-trichloromethyl-1,2,4-oxadiazole,
3-(2,3-dibromopropyl)-5-trichloromethyl-1,2,4-oxadiazole,
3-(4-chlorophenyl)-5-trichloromethyl-1,2,4-oxadiazole,
3-(4-chlorobenzyl)-5-trichloromethyl-1,2,4-oxadiazole,
3-(5-nitrofuranyl-2)-5-trichloromethyl-1,2,4-oxadiazole,
3-(4-pyridyl)-5-trichloromethyl-1,2,4-oxadiazole,
3-chloromethyl-5-trichloromethyl-1,2,4-oxadiazole,
3-(2-pyridiyl)-5-trichloromethyl-1,2,4-oxadiazole, and the like.

Still other illustrative compounds are 3-cyclopentyl-5-trichloromethyl-1,2,4-oxadiazole,
3-methoxymethyl-5-trichloromethyl-1,2,4-oxadiazole;
3-(3'-methyloxadiazol-5-yl)-5-trichloromethyl-1,2,4-oxadiazole,
3-(2-cyanoethyl)-5-trichloromethyl-1,2,4-oxadiazole,
3-(8,9-dichloroheptadecyl)-5-trichloromethyl-1,2,4-oxadiazole,
3-(2-tetrahydrofuryl)-5-trichloromethyl-1,2,4-oxadiazole,
3-benzyl-5-trichloromethyl-1,2,4-oxadiazole,
3-(1-acetoxyethyl)-5-trichloromethyl-1,2,4-oxadiazole,
3-(2-bicyclo[2,2,1]heptyl)-5-trichloromethyl-1,2,4-oxadiazole,
1,2-bis(5-trichloromethyl-1,2,4-oxadiazol-3-yl)ethane, and
3-acetyl-5-trichloromethyl-1,2,4-oxadiazole.

The aforementioned starting materials can be prepared by a variety of methods. In example, in one method the preparation is carried out by contacting, in an inert normally liquid organic vehicle, a substituted hydroxamyl halide, e.g., methyl glyoxalate chloroxime, furohydroxamyl chloride, propyl glyoxalate chloroxime, and the like, with a nitrile, e.g., trichloroacetonitrile, at elevated temperatures, e.g., from about 40° C. to about 150° C., until evolution of hydrogen halides ceases. The reaction is schematically shown below:

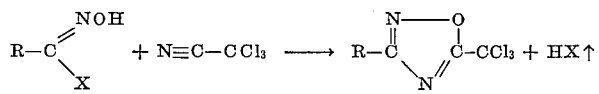

wherein R has the same value as previously indicated. The product is recovered by conventional methods such as crystallization filtration, and the like.

A further method of preparation involves fusing together in a molar ratio of about 1:1 a substituted amidoxime salt or an amidoxime, e.g., acetamidoxime, salts of acetamidoxime, trichloromethyl amidoxime, salts of trichloromethyl amidoxime, furoylamidoxime, salts of furoylamidoxime, and the like, and a substituted amide, e.g., acetamide, butyramide, trichloroacetamide, 2,3,4-pyridine-carboxamide, and the like. The resulting melt is maintained at a temperature between about 80° C. and 200° C. The compound is formed as follows:

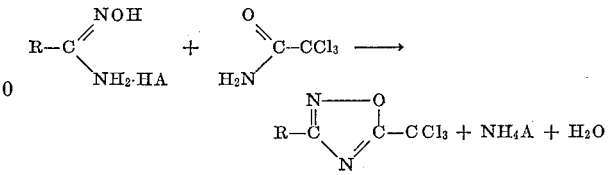

wherein HA can be a mineral acid or an organic acid. The reaction time can vary from a few minutes to several hours. A preferred reaction time is of the order of about 15 minutes. The oxadiazole may be reclaimed from the reaction product by conventional techniques such as recrystallization, sublimation, extraction, and the like.

As hereinbefore indicated, certain of the compositions which can be prepared by the process of this invention have not previously been described in the literature. These compositions can be represented by the formula:

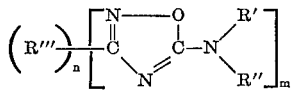

wherein R''' represents an aliphatic, cycloaliphatic, substituted aromatic, or heterocyclic groups of up to 18 carbon atoms; R' and R'' represent hydrogen, aliphatic, cycloaliphatic or aromatic groups, or both R' and R'' when taken together can form a 5 or 6 membered cyclic group with the nitrogen atom to which they are attached, $m$ has a value of 1 or 2, and $n$ has a value of 1 when $m$ is 1, and a value of zero or 1 when $m$ is 2.

Preferred novel compositions within this aspect of the invention include those wherein R''' represents alkyl, alkenyl, hydroxalkyl, haloalkyl, cycloalkyl, cycloalkenyl, cycloalkylalkyl, cycloalkenylalkyl, haloaryl, haloarylalkyl, pyridyl, nitrofuryl and the like; and R' and R'' represent hydrogen, alkyl, alkenyl, cycloalkyl, cycloalkenyl, aryl, aralkyl, alkaryl, amino (when the other substituent is hydrogen), aminoalkyl, alkylaminoalkyl, dialkylaminoalkyl, or both R' and R'' when taken with the nitrogen atom to which they are attached can represent pyridyl, piperidyl, pyrrolidyl, and the like.

When R''' is an aromatic group it is substituted with such groups as halo, i.e., chloro, bromo, iodo, and the like like; alkoxy; i.e., methoxy, ethoxy, and the like, alkyl, i.e., methyl, ethyl, propyl and the like, hydroxyl, nitro, amino, cyano, and the like.

The hydrohalide salts of the compositions which can be prepared by the process of this invention are considered to be the full equivalence of the free base form.

The composition which can be prepared by the process of this invention are useful for a wide variety of applications. For example, the oxadiazoles containing primary or secondary amine groups are useful as curing agents or hardeners for epoxy resin systems. Additionally, due to their biological activity, certain compositions are useful in agricultural applications as nematocides for combating root-knot nematodes which incite distinct galls or knots on the roots of certain plants such as tomatoes, cucumbers, potatoes and the like. The effectiveness of these compositions in combating nematodes is demonstrated by field tests involving the application of the oxadiazole to infested soil in which plants are grown and comparing the results with plants grown in untreated soil.

The following examples are illustrative:

EXAMPLE 1

Preparation of 3-methyl-5-trichloromethyl-1,2,4-oxadiazole and similar compounds Acetamidoxime (0.1 mole, 7.4 grams) was added in small portions to trichloroacetic anhydride (0.25 mole, 77.25 grams). During the addition the temperature of the resulting mixture did not exceed 30° C. After dissolution the resulting mixture was heated to about 130°–140° C. and maintained thereat for a time period of about one hour. Thereafter the resulting reaction product mixture was cooled and poured into water contained in a separatory funnel whereby an aqueous phase and an organic phase formed. The phases were separated and the aqueous phase extracted three times with diethyl ether. The resulting ethereal solution was washed with water, then with an aqueous solution of sodium bicarbonate until evolution of carbon dioxide ceased, again with water, then dried by means of sodium sulfate and subsequently concentrated by evaporating some of the diethyl ether.

The organic phase was subjected to a similar treatment, i.e., washed with water, then an aqueous sodium bicarbonate solution, and again with water. The concentrated ethereal solution obtained from the aqueous phase was then combined with the treated organic phase.

The resulting solution then was subject to distillation under reduced pressure, i.e., about 2 mm. of Hg. Fourteen grams of distillate having a boiling point of 54° C. at a pressure of 5 mm. of Hg was obtained. The distillate was identified as 3-methyl-5-trichloromethyl-1,2,4-oxadiazole. The actual yield was 70% of the theoretical yield.

In an analogous manner as above, two additional oxadiazoles were prepared from trichloroacetamidoxime and phthalimido-propylamidoxime to give respectively 3,5-di(trichloromethyl) - 1,2,4-oxadiazole and 3($\beta$-phthalamido)-ethyl-5-trichloromethyl-1,2,4-oxadiazole.

EXAMPLE 2

Preparation of bis(5-trichloromethyl-1,2,4-oxadiazolyl-3)

A mixture of oxamidedioxime (0.5 mole, 59 grams) and trichloroacetic anhydride (2.2 moles, 679 grams) was heated to 130°–140° C. and maintained at this temperature for 3 hours. The mixture was then poured on ice and neutralized with a saturated solution of $NaHCO_3$. The resulting crystalline product was filtered off, washed with water and recrystallized from ethyl alcohol. The crystalline product was identified as bis(5-trichloromethyl-1,2,4-oxadiazolyl-3) obtained in a 85% yield. Its melting point was 142° C.

EXAMPLE 3

Preparation of 1,4-bis(5-trichloromethyl-oxadiazolyl)-n-butane

Adipamidedioxime (0.2 mole, 35 grams) and trichloroacetic anhydride (0.88 mole, 270 grams) were heated together for 3 hours at a temperature of about 130°–140° C. The resulting dark-colored product mixture was poured on ice, neutralized with $NaHCO_3$ and filtered. Eighty grams of a crystalline product were obtained upon filtration and identified as 1,4-bis(5-trichloromethyl-oxadiazolyl)-n-butane. The yield was 83%. The thus obtained crude oxadiazole was dissolved in hexane and filtered. The solvent was evaporated in vacuo and the resulting crystals were dissolved in a water-ethanol solution and recrystallized. Melting point of the recrystallized compound was 55° C.

EXAMPLE 4

Preparation of 3-isopropyl-5-trichloromethyl-1,2,4-oxadiazole

To trichloroacetic anhydride (0.3 mole, 92.7 grams) was added dropwise, with stirring 2-methyl-propamidoxime (0.15 mole, 15.1 grams) so that the temperature remained at 40°–50° C. When the addition was complete the reaction mixture was heated to about 120° C. for one hour and then poured into ice water. This mixture was then stirred and thoroughly extracted with methylene chloride. These extracts were dried with potassium carbonate, filtered, and subsequently distilled to yield about 23 grams of water-white liquid, B.P. 59–60° C. at 2 mm. of Hg containing a small amount of solid. Filtration and redistillation resulted in 21 grams (74% yield of a clear liquid having a boiling point of about 48°–49° C. at 1 mm. of Hg. This liquid was identified as 3-isopropyl-5-trichloromethyl-1,2,4-oxadiazole.

Analysis.—Calculated (percent): C, 31.43; H, 3.07; N, 12.02. Found (percent): C, 31.38; H, 3.14; N,13.01.

EXAMPLE 5

Preparation of 3-(2-pyridyl)-5-trichloro-methyl-1,24-oxadiazole 2-picolinamidoxime (0.1 mole, 13.7 grams) was added in small portions to trichloroacetic anhydride (0.2 mole, 62 grams). The resulting mixture was heated to 110° C. for 1 hour and poured into cold water. The reaction product was extracted with methylene chloride, washed with water, with a sodium bicarbonate solution, again with water and dried over calcium chloride. From the extract methylene chloride was evaporated and the residue was distilled at a temperature of about 148°–160° C. and at about 2 mm. of Hg pressure. The distillate was crystallized from methanol/water solution and was identified as 3-(2-pyridyl)-5-trichloromethyl-1,2,4-oxadiazole. Its boiling point was 44°–45° C. and its yield was 18 grams (67%).

In a similar manner, when the 2-picolinamidoxime is replaced with 5-nitrofur-2-yl-acetamidoxime there is obtained the 3-(5'-nitrofur-2'-yl)-5-amino-1,2,4-oxadiazole.

EXAMPLE 6

Preparation of 3-ethyl-5-trichloromethyl-1,2,4-oxadiazole

Propionamidoxime (22 grams) and trichloroacetic anhydride (154 grams) were processed according to the technique set forth in the previous examples. 20 grams of 3 - ethyl - 5 - trichloromethyl-1,2,4-oxadiazole was obtained (35% yield based on the propionitrile used for the preparation of the amidoxime); having a boiling point of 39° C. at 0.5 mm. of Hg pressure.

Analysis.—Calcd. (percent): C, 27.85; H, 2.32; N, 13.00. Found (percent): C, 28.34; H, 2.50; N, 12.69.

In a similar manner, propionamidoxime is replaced with 2-propenamidoxime and the desired 3-vinyl-5-amino-1,2,4-oxadiazole is obtained. Likewise the use of 3-hydroxy-propionamidoxime gives the 3-$\beta$-hydroxyethyl-5-amino-1,2,4-oxadiazole.

EXAMPLE 7

Preparation of 3-monochloromethyl-5-trichloro-methyl-1,2,4-oxadiazole

Monochloroacetamidoxime (0.139 mole, 15 grams) was added in small quantities to trichloroacetic anhydride (0.278 mole, 88.5 grams) under cooling.

The mixture was heated to 100°–110° C. and maintained at this temperature for 4 hours. The resulting brown solution was poured onto crushed ice. An aqueous phase and an organic phase were formed. The organic phase was separated, dissloved in diethyl ether, washed first with an aqueous sodium bicarbonate solution, then with water and finally dried with sodium sulfate. The diethyl ether was then evaporated and the residue was dissolved in petroleum ether, and filtered in order to remove small quantities of amides. Petroleum ether was then evaporated from the solution and the residue fractionated. Fractionation yielded 19.2 grams of 3-monochloromethyl-5-trichloromethyl-1,2,4-oxadiazole which had a boiling point of 66.5° C. at 1.5 mm. of Hg pressure. The yield was 61%.

Analysis.—Calculated (percent): C, 20.18; H, 0.85; N, 11.88. Found (percent): C, 20.33; H, 0.94; N, 12.03.

EXAMPLE 8

Preparation of 3-(t-butyl)-5-trichloromethyl-1,2,4-oxadiazole

To trichloroacetic anhydride (0.2 mole, 65 grams) in a 200 ml. Erlenmeyer flask fitted with a condenser (protected by a drying tube) and a stirring bar, was added, with stirring, portionwise, pivalamidoxime (0.1 mole, 11.6 grams) at such a rate that the temperature remained between 35° and 45° C. The resulting mixture was then maintained at 130°–140° C. for one hour and then poured over ice-water mixture. An aqueous phase and an organic phase were formed. The organic phase was extracted with 3×100 ml. of methylene chloride, the extract dried with $Na_2SO_4$ and then filtered and distilled to give 14.6 grams of colorless liquid having a boiling point of 57° C. at 0.8–0.9 mm. of Hg pressure. This liquid was identified as 3 - (t - butyl) - 5 - trichloromethyl - 1,2,4 - oxadiazole. Its yield was 61%.

*Analysis.*—(Calculated for $C_7H_9Cl_3N_2O$) (percent): C, 34.52; H, 3.72; N, 11.51. Found (percent): C, 34.87; H, 3.88; N, 11.55, 11.79.

EXAMPLE 9

Preparation of 3-(cyclohexen-3-yl)-5-trichloromethyl-1,2,4-oxadiazole

In a manner analogous to Example 1 3-(cyclohexen-3-yl)amidoxime is reacted with trichloroacetic anhydride to give 3 - (cyclohexen - 3 - yl) - 5 - trichloromethyl-1,2,4-oxadiazole.

*Analysis.*—Calculated (percent): C, 23.82; H, 1.48; N, 13.89. Found (percent): C, 24.11; H, 1.49; N, 14.12.

EXAMPLE 10

Preparation of 3-phenyl-5-trichloromethyl-1,2,4-oxadiazole

Benzamidoxime (13.6 grams, 0.1 mole) was added gradually to trichloroacetic anhydride (77.2 grams, 0.25 mole). After addition the resulting mixture was heated to about 130°–140° C. for about one hour. The resulting reaction product mixture was then poured over crushed ice. An aqueous phase and an organic phase were formed. The organic phase was extracted with diethyl ether. The resulting extract was washed with water, with an aqueous sodium bicarbonate solution, and again with water. The extract was then dried with sodium sulfate and part of the diethyl ether evaporated. The remaining liquid was fractionated and 14 grams of the oxadiazole was obtained. This corresponded to a 70% yield. The compound was observed to have a boiling point of 54° C. at 5 mm. of Hg.

In a similar manner, benzamidoxime is replaced with p-chlorobenzamidoxime and p-chlorophenylacetamidoxime to obtain 3 - (p - chlorophenyl) - 5-trichloromethyl-1,2,4 - oxadiazole and 3 - (p - chlorobenzyl)-5-trichloromethyl-1,2,4-oxadiazole respectively.

EXAMPLE 11

Preparation of 3-methyl-5-amino-1,2,4-oxadiazole

To a flask containing 0.1 mole of 3-methyl-5-trichloromethyl-1,2,4-oxadiazole dissolved in 200 cubic centimeters of methanol, is added ammonia at 0° C. until the mixture is saturated and the temperature is then allowed to rise to 20° C. and the reaction mixture is maintained at 60° C. for two hours. Thereafter the solvent is evaporated and the residue taken over with benzene. After recrystallization there was obtained 3-methyl-5-amino-1,2,4-oxadiazole in 60 percent yield. The product had a melting point of 161° C.

EXAMPLES 12–32

Preparation of 3-phenyl-5-quanidyl-1,2,4-oxadiazole

To a solution of sodium alcoholate prepared by dissolving 1.38 grams of Na in 25 cc. of ethanol, is introduced 0.06 mole of guanidine chlorohydrate. The precipitated NaCl is filtered off and to the free guanidine solution, is added 0.01 mole of 3-phenyl-5-trichloromethyl-1.2.4-oxadiazole. This reaction mixture is then left to stand for 2 hours and thereafter maintained at 60° C. for 3 hours. After evaporation of the solvent, the residue is washed up with water and filtrated. From the solution, 3-phenyl - 5 - guanidyl - 1.2.4 - oxadiazole is obtained by recrystallization. The product was obtained in a yield of 74 percent and had a melting point of 270° C.

In a similar manner, other oxadiazoles were prepared. The pertinent data are set forth in Tables I and II below:

TABLE I

| Example No. | Starting materials used | | Reactions conditions | | | |
|---|---|---|---|---|---|---|
| | 1.2.4-oxadiazoles | Amines | Solvent | Temp., °C. | Time, hours | Yield, percent |
| 13 | $CH_3-C(=N-O-)(=N-)C-CCl_3$ | $H-NH_2$ | Methanol | 60 | 2 | 60 |
| 14 | id | $H-N(CH_3)_2$ | Ethanol | 20 | 72 | 76 |
| 15 | $C_6H_5-C(=N-O-)(=N-)C-CCl_3$ | $H-N(CH_2-CH_2)_2$ (pyrrolidine ring) | Pyrrolidine | 80 | 24 | 68 |
| 16 | id | $H-NH_2$ | Methanol | 60 | 4 | 85 |
| 17 | id | $H-NH-NH_2 \cdot H_2O$ | do | 60 | ¼ | |
| 18 | id | $H-NHCH_2CH_2OH$ | Ethanol amine | 100 | 2 | |
| 19 | id | $H-N(CH_2-CH_2)_2CH_2$ (piperidine ring) | Piperidine | 100 | 24 | 62 |
| 20 | id | $H-NH-\overset{NH}{\underset{\parallel}{C}}-NH_2$ | Ethanol | 80 | 3 | 75 |
| 21 | $CCl_3-C(=N-O-)(=N-)C-C(=N-O-)(=N-)C-CCl_3$ | $H-NH_2$ | Methanol | 20 | ½ | 55 |

TABLE I.—Continued

| Example No. | Starting materials used | | Reactions conditions | | | Yield, percent |
|---|---|---|---|---|---|---|
| | 1,2,4-oxadiazoles | Amines | Solvent | Temp., °C. | Time, hours | |
| 22 | $CCl_3-C\overset{O-N}{\underset{N}{\diagup\diagdown}}C-(CH_2)_4-C\overset{N-O}{\underset{N}{\diagup\diagdown}}C-CCl_3$ | $H-NHNH_2 \cdot H_2O$ | Hydrazine hydrate. | 90 | ¼ | 90 |
| 23 | $O_2N-C\overset{HC-CH}{\underset{O}{\diagup\diagdown}}C-C\overset{N-O}{\underset{N}{\diagup\diagdown}}C-CCl_3$ | $H-NH_2$ | Ethanol | 80 | 3 | 79 |
| 24 | $OH-(CH_2)_2-C\overset{N-O}{\underset{N}{\diagup\diagdown}}C-CCl_3$ | $H-NH_2$ | Methanol | 20 | 24 | 78 |
| 25 | Id | $H-N(CH_3)_2$ | Ethanol | 20 | 24 | 65 |
| 26 | $CH_2=CH-C\overset{N-O}{\underset{N}{\diagup\diagdown}}C-CCl_3$ | $H-NH_2$ | Methanol | 20 | 4 | 60 |
| 27 | $CH_3-C\overset{N-O}{\underset{N}{\diagup\diagdown}}C-CCl_3$ | $H-NHCH_2CH_2N(C_2H_5)_2$ | | 80 | 2 | 92 |
| 28 | $CH_3-C\overset{N-O}{\underset{N}{\diagup\diagdown}}C-CCl_3$ | $H-NHCH_2CH_2N(CH_3)_2$ | | 80 | 2 | 60 |
| 29 | $C_6H_5-C\overset{N-O}{\underset{N}{\diagup\diagdown}}C-CCl_3$ | $H-NHCH_2CH_2N(CH_3)_2$ | | 80 | 2 | 80 |
| 30 | $Cl_6H_5-C\overset{N-O}{\underset{N}{\diagup\diagdown}}C-CCl_3$ | $H-NHCH_2CH_2N(C_2H_5)_2$ | | 80 | 2 | 96 |
| 31 | $Cl-C_6H_4-C\overset{N-O}{\underset{O}{\diagup\diagdown}}C-CCl_3$ | $H-NHCH_2CH_2N(C_2H_5)_2$ | | 80 | 2 | 80 |
| 32 | $Cl-C_6H_4-CH_2-C\overset{N-O}{\underset{N}{\diagup\diagdown}}C-CCl_3$ | $H-NHCH_2CH_2N(C_2H_5)_2$ | | 80 | 2 | |

TABLE II

| Example No. | Reaction products | | Analysis | | | | | | | |
|---|---|---|---|---|---|---|---|---|---|---|
| | Name | Melting of ebullition point, in ° C. | Calculated | | | | Found | | | |
| | | | C | H | N | O | C | H | N | O |
| 13 | 3-methyl-5-amino-1,2,4-oxadiazole | 161 | 36.36 | 5.05 | 42.42 | | 35.56 | 4.96 | 42.39 | |
| 14 | 3-methyl-5-dimethylamino-1,2,4-oxadiazole | Eb. 86-87, 15 Torr | 47.23 | 7.07 | 33.07 | | 47.29 | 7.05 | 33.0 | |
| 15 | 3-phenyl-5-N-pyrrolidyl-1,2,4-oxadiazole | 73 | 67.00 | 6.05 | | | 67.18 | 6.07 | | |
| 16 | 3-phenyl-5-amino-1,2,4-oxadiazole | 152 | | | | | | | | |
| 17 | 3-phenyl-5-hydrazino-1,2,4-oxadiazole | 169-171 | 54.54 | 4.57 | | 9.09 | 54.98 | 4.63 | | 9.06 |
| 18 | 3-phenyl-5-N-ethanolamino-1,2,4-oxadiazole | 98 | 58.53 | 5.36 | 15.60 | | 58.26 | 5.27 | 15.79 | |
| 19 | 3-phenyl-5-N-piperidyl-1,2,4-oxadiazole | Eb. 141-142, 0.2 Torr | 68.03 | 6.55 | 18.30 | | 68.07 | 6.56 | 18.30 | |
| 20 | 3-phenyl-5-guanadyl-1,2,4-oxadiazole | 270 | 41.40 | 1.37 | | 38.40 | 40.94 | 1.42 | | 38.48 |
| 21 | 5,5'-diamino-bi(1,2,4-oxadiazolyl) | >340 | 28.60 | 2.38 | 50.24 | | 28.98 | 2.56 | 50.00 | |
| 22 | 1,4-di(5-amino-1,2,4-oxadiazolyl)n-butane | 182 | 37.79 | 5.51 | 44.09 | | 37.97 | 5.53 | 43.24 | |
| 23 | 3-(5'-nitrofur-2'-yl)-5-amino-1,2,4-oxadiazole | >220 | 36.65 | 2.04 | 28.05 | | 36.59 | 1.96 | 28.57 | |
| 24 | 3-β-hydroxyethyl-5-amino-1,2,4-oxadiazole | 115-116 | 37.21 | 5.42 | 32.56 | | 37.52 | 5.64 | 32.36 | |
| 25 | 3-β-hydroxyethyl-5-dimethylamino-1,2,4-oxadiazole | 85 | 45.85 | 7.00 | 26.75 | | 46.05 | 7.03 | 25.46 | |
| 26 | 3-vinyl-5-amino-1,2,4-oxadiazole | 133-134 | 43.24 | 4.50 | 37.83 | | 43.18 | 4.45 | 37.42 | |
| 27 | 3-methyl-5-diethylaminoethylamino-1,2,4-oxadiazole | Bp 83°/0.005 mm. Hg | 54.54 | 9.09 | 28.28 | | 54.10 | 9.15 | 28.65 | |
| 28 | 3-methyl-5-diethylaminoethylamino-1,2,4-oxadiazole | Bp 94°/0.01 mm. Hg | 49.41 | 8.23 | | 9.41 | 49.28 | 8.41 | | 9.85 |
| 29 | 3-phenyl-5-diethylaminoethylamino-1,2,4-oxadiazole | Bp 154°, di HCl | 56.66 | 7.08 | 18.88 | | 55.70 | 7.13 | 18.09 | |
| 30 | 3-p-chlorophenyl-5-diethylaminoethylamino-1,2,4-oxadiazole | Bp 132°, HCl | 50.70 | 6.04 | 16.91 | | 50.33 | 6.24 | 16.64 | |
| 31 | 3-p-chlorobenzyl-5-diethylaminoethylamino-1,2,4-oxadiazole | | 60.50 | 5.62 | 8.07 | | 60.43 | 5.72 | 7.88 | |

What is claimed is:
1. A process for the preparation of 5-amino-1,2,4-oxadiazoles of the formula:

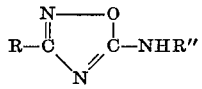

which comprises contacting a 5-trichloromethyl-1,2,4-oxadiazole of the formula:

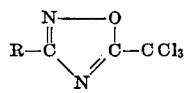

with a nitrogen compound of the formula:

R''NH$_2$ wherein R represents a member selected from the group consisting of phenyl, p-chlorophenyl, p-chlorophenylmethyl, alpha-pyridyl and methyl groups and R'' represents a member selected from the group consisting of hydrogen, diethylaminoethyl and dimethylaminoethyl groups.

References Cited

UNITED STATES PATENTS 3,203,959  8/1963  Huffman  260—307.7

OTHER REFERENCES

Elderfield, Heterocyclic Compounds, vol. 7, 1961, p. 521.

Jouillie et al.: J. Am. Chem. Soc., vol. 76 (1954), pp. 2990–3.

ALEX MAZEL, Primary Examiner

R. J. GALLAGHER, Assistant Examiner

U.S. Cl. X.R.

260—2, 294.7, 296, 297, 307